(12) United States Patent
Majmundar et al.

(10) Patent No.: US 11,212,022 B2
(45) Date of Patent: Dec. 28, 2021

(54) RADIO SHARING FOR MULTIPLE WIRELESS SUBSCRIBER IDENTITIES

(71) Applicant: AT&T Intellectual Property I, L.P., Atlanta, GA (US)

(72) Inventors: Milap Majmundar, Austin, TX (US); Ralf Bendlin, Cedar Park, TX (US); Thomas Novlan, Cedar Park, TX (US); Xiaoyi Wang, Austin, TX (US); Arunabha Ghosh, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 73 days.

(21) Appl. No.: 16/789,076

(22) Filed: Feb. 12, 2020

(65) Prior Publication Data
US 2021/0105078 A1    Apr. 8, 2021

Related U.S. Application Data

(60) Provisional application No. 62/910,965, filed on Oct. 4, 2019.

(51) Int. Cl.
| | |
|---|---|
| *H04J 3/02* | (2006.01) |
| *H04W 68/02* | (2009.01) |
| *H04W 72/04* | (2009.01) |
| *H04W 74/08* | (2009.01) |
| *H04W 76/19* | (2018.01) |

(52) U.S. Cl.
CPC .............. *H04J 3/02* (2013.01); *H04W 68/02* (2013.01); *H04W 72/0406* (2013.01); *H04W 74/0833* (2013.01); *H04W 76/19* (2018.02)

(58) Field of Classification Search
CPC ......... H04J 3/02; H04W 76/19; H04W 68/02; H04W 72/0406; H04W 74/0833
See application file for complete search history.

(56) References Cited

U.S. PATENT DOCUMENTS

| | | | |
|---|---|---|---|
| 10,548,181 B2 * | 1/2020 | Siomina ................ | H04W 24/10 |
| 2013/0188543 A1 * | 7/2013 | Dwyer .................. | H04W 72/04 370/311 |

(Continued)

OTHER PUBLICATIONS

Notice of Allowance received for U.S. Appl. No. 16/796,352 dated Mar. 31, 2020, 34 pages.

(Continued)

*Primary Examiner* — Joshua L Schwartz
(74) *Attorney, Agent, or Firm* — Amin, Turocy & Watson, LLP

(57) ABSTRACT

The described technology is generally directed towards sharing a radio by multiple subscriber identities at a device. A time division multiplexing pattern at the device radio gives primary radio use to a first subscriber identity, while also providing time windows for radio use to a second subscriber identity. In response to a communication by the second subscriber identity, the time division multiplexing pattern can be changed to give the primary radio use to the second subscriber identity. Also, a radio resource control protocol can designate appropriate states for the different subscriber identities, designating the subscriber identity with primary radio use as connected, while the other subscriber identity is designated as inactive or idle.

20 Claims, 13 Drawing Sheets

(56) References Cited

U.S. PATENT DOCUMENTS

| | | | |
|---|---|---|---|
| 2013/0194941 A1* | 8/2013 | Lu | H04W 76/27 370/252 |
| 2013/0267261 A1 | 10/2013 | Nikkelen | |
| 2015/0092630 A1* | 4/2015 | Lin | H04W 48/20 370/280 |
| 2015/0180514 A1 | 6/2015 | Pavacic et al. | |
| 2015/0105120 A1 | 8/2015 | Lim | |
| 2015/0255858 A1 | 9/2015 | Li et al. | |
| 2017/0094568 A1 | 3/2017 | Yang et al. | |
| 2019/0132090 A1 | 5/2019 | Khameneh et al. | |
| 2019/0166475 A1 | 5/2019 | Nanakandiyil et al. | |
| 2019/0174436 A1* | 6/2019 | da Silva | H04W 16/12 |
| 2020/0092685 A1* | 3/2020 | Fehrenbach | H04B 7/2606 |
| 2020/0245292 A1 | 7/2020 | Huang et al. | |

OTHER PUBLICATIONS

Notice of Allowance received for U.S. Appl. No. 16/777,378 dated Mar. 30, 2021, 29 pages.
ETSI TS 138 331 V15.6.0 (Jul. 2019)5G;NR; Radio Resource Control (RRC); Protocol specification (3GPP TS 38.331 version 15.6.0 Release 15), 516 pages.
Non-Final Office Action received for U.S. Appl. No. 16/777,378 dated Dec. 24, 2020, 31 pages.

\* cited by examiner

RADIO SHARING FOR MULTIPLE WIRELESS SUBSCRIBER IDENTITIES

RELATED APPLICATION

This application is a nonprovisional of, and claims priority to U.S. Provisional Patent Application No. 62/910,965, filed on 4 Oct. 2019, and entitled "RADIO SHARING FOR MULTIPLE WIRELESS SUBSCRIBER IDENTITIES." The entirety of the aforementioned application is hereby incorporated by reference herein.

TECHNICAL FIELD

The subject application is related to wireless communication systems in general, and to fifth generation (5G) and subsequent generation cellular communication systems in particular.

BACKGROUND

Cellular devices can potentially be equipped to provide service to multiple subscriber identities, e.g., by including more than one subscriber identity module (SIM). Multi-SIM devices would give the device owner(s) the flexibility to decide when to use which subscription service. In general, multi-SIM devices could be useful in multiple scenarios. For example, one SIM can be used for personal use, and another SIM for business use. One SIM can be used for domestic use, and another SIM for international use to avoid international roaming charges on a domestic subscription. One SIM can be used for public safety applications, when the subscriber is, for example, a fire-fighter, emergency responder, law enforcement, etc., and another SIM for can be for personal use. In the case of a connected car equipped with a multi-SIM cellular device, one SIM can be used for safety services (e.g. collision avoidance, emergency braking, accident alerts, etc.), and another SIM can be used for information and entertainment services for passengers in the vehicle.

While multi-SIM devices could optionally be equipped with multiple transceivers or radios, e.g. a radio for each SIM, it may be preferable for multiple SIMs to share a radio. For example, a dual-SIM device equipped with a single shared radio may be referred to herein as a dual SIM dual standby (DSDS) device. In general, when multiple SIMs on a device share a radio, the multiple SIMs may potentially be associated with one or more device operators. Similarly, the multiple SIMs may potentially be associated with one or more radio access networks (RANs), and the multiple SIMs may potentially be associated with one or more core networks. There is a need in the industry for techniques to coordinate radio sharing among multiple subscriber identities at a device.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
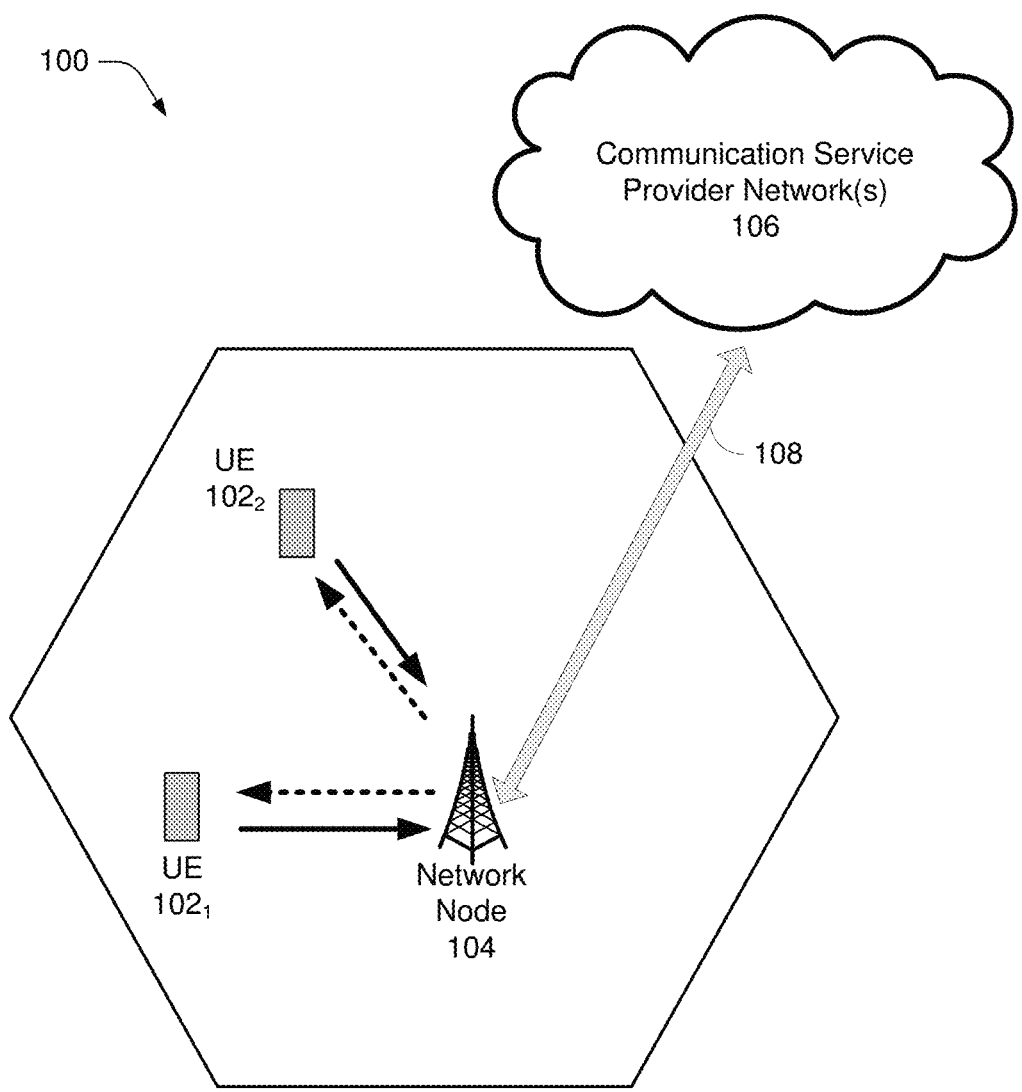
FIG. 1 illustrates an example wireless communication system, in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details, and without applying to any particular networked environment or standard.

One or more aspects of the technology described herein are generally directed towards sharing a radio by multiple subscriber identities at a device. A time division multiplexing pattern at the radio gives primary radio use to a first subscriber identity, while also providing some time windows for radio use to a second subscriber identity. In response to a communication by the second subscriber identity, the time division multiplexing pattern can be changed to give the primary radio use to the second subscriber identity. Also, a radio resource control protocol can designate appropriate states for the different subscriber identities, designating the subscriber identity with primary radio use as connected, while the other subscriber identity is designated as inactive or idle.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), fifth generation core (5G Core), fifth generation option 3x (5G Option 3x), high speed packet access (HSPA), Z-Wave, Zigbee and other 802.XX wireless technologies and/or legacy telecommunication technologies.

FIG. 1 illustrates a non-limiting example of a wireless communication system 100 in accordance with various aspects and embodiments of the subject disclosure. In one or more embodiments, system 100 can comprise one or more user equipment UEs 1021, 1022, referred to collectively as UEs 102, a network node 104, and communication service provider network(s) 106.

The non-limiting term "user equipment" can refer to any type of device that can communicate with a network node 104 in a cellular or mobile communication system 100. UEs 102 can have one or more antenna panels having vertical and horizontal elements. Examples of UEs 102 comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, and the like. UEs 102 can also comprise IOT devices that communicate wirelessly.

In various embodiments, system 100 comprises communication service provider network(s) 106 serviced by one or more wireless communication network providers. Communication service provider network(s) 106 can include a "core network". In example embodiments, UEs 102 can be communicatively coupled to the communication service provider network(s) 106 via network node 104. The network node 104 (e.g., network node device) can communicate with UEs 102, thus providing connectivity between the UEs 102 and the wider cellular network. The UEs 102 can send transmission type recommendation data to the network node 104. The transmission type recommendation data can comprise a recommendation to transmit data via a closed loop MIMO mode and/or a rank-1 precoder mode.

A network node 104 can have a cabinet and other protected enclosures, computing devices, an antenna mast, and multiple antennas for performing various transmission operations (e.g., MIMO operations). Network node 104 can comprise one or more base station devices which implement features of the network node 104. Network nodes can serve several cells, also called sectors, depending on the configuration and type of antenna. In example embodiments, UEs 102 can send and/or receive communication data via a wireless link to the network node 104. The dashed arrow lines from the network node 104 to the UEs 102 represent downlink (DL) communications and the solid arrow lines from the UEs 102 to the network node 104 represents an uplink (UL) communications.

Communication service provider networks 106 can facilitate providing wireless communication services to UEs 102 via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, millimeter wave networks and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.).

The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation). In an embodiment, network node 104 can be part of an integrated access and backhaul network. This may allow easier deployment of a dense network of self-backhauled 5G cells in a more integrated manner by building upon many of the control and data channels/procedures defined for providing access to UEs.

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G or subsequent generation wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network can utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the 3GPP and has been in use (including with LTE), is a multi-antenna technique that can improve the spectral efficiency of transmissions, thereby significantly boosting the overall data carrying capacity of wireless systems. The use of MIMO techniques can improve mmWave communications and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are planned for use in 5G systems.

Figure 2:
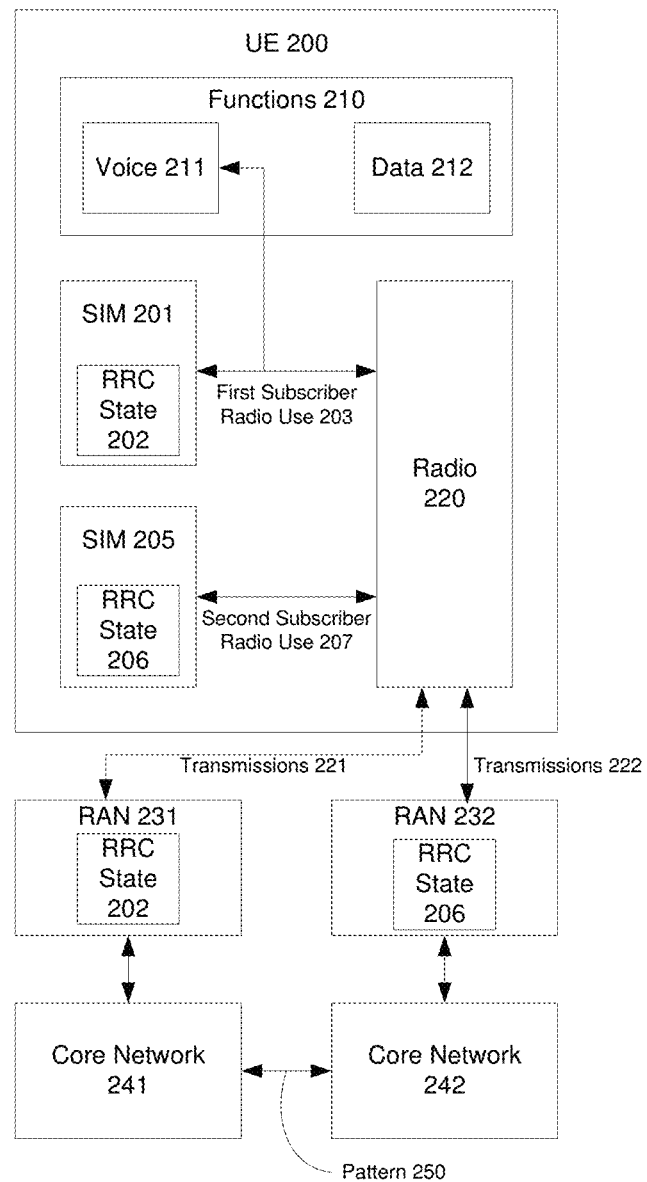
FIG. 2 illustrates an example user equipment (UE) comprising multiple subscriber identities, in accordance with various aspects and embodiments of the subject disclosure.

FIG. 2 illustrates an example user equipment (UE) comprising multiple subscriber identities, in accordance with various aspects and embodiments of the subject disclosure. The example UE 200 may implement, e.g., a UE 102 illustrated in FIG. 1. FIG. 2 includes example UE 200, RAN 231, RAN 232, core network 241, and core network 242. Illustrated aspects of UE 200 include functions 210, SIM 201 having an RRC state 202, SIM 205 having an RRC state 206, and radio 220. Functions 210 include voice 211 and data 212 functions. Also, RAN 231 includes RRC state 202, and RAN 232 includes RRC state 206.

In FIG. 2, UE 200 includes multiple subscriber identities, which are implemented via SIM 201 and SIM 202. Device functions 210 can be performed in connection with either SIM 201 or SIM 202. The SIMs 201, 202 share radio 220. Thus for example, SIM 201 can make a first subscriber radio use 203 of radio 220, and radio 220 can send transmissions 221 to RAN 231 on behalf of SIM 201. SIM 205 can make a second subscriber radio use 207 of radio 220, and radio 220 can send transmissions 222 to RAN 232 on behalf of SIM 205. In FIG. 2, the first subscriber radio use 203 is a voice call, however, any use is permitted as will be appreciated. The second subscriber radio use 207 is not associated with a function 210. This is because, in the example of FIG. 2, the first subscriber radio use 203 is the primary radio use, and the second subscriber radio use 207 is in the context of an inactive or idle state, as will be explained further herein.

UE 200 can implement an RRC protocol, which designates a radio use by a subscriber identity, e.g., by SIM 201 or SIM 202, as "connected", "inactive", or "idle". The RRC protocol is described further in connection with FIG. 4. In the example provided by FIG. 2, the RRC protocol can for example set an RRC state 202 for SIM 201 as "connected", and the RRC protocol can also update the RRC state 202 at RAN 231, so the RRC states 202 agree. The RRC protocol can also for example set an RRC state 206 for SIM 205 as "inactive" or "idle", and the RRC protocol can also update the RRC state 206 at RAN 232, so the RRC states 206 agree.

Figure 3:
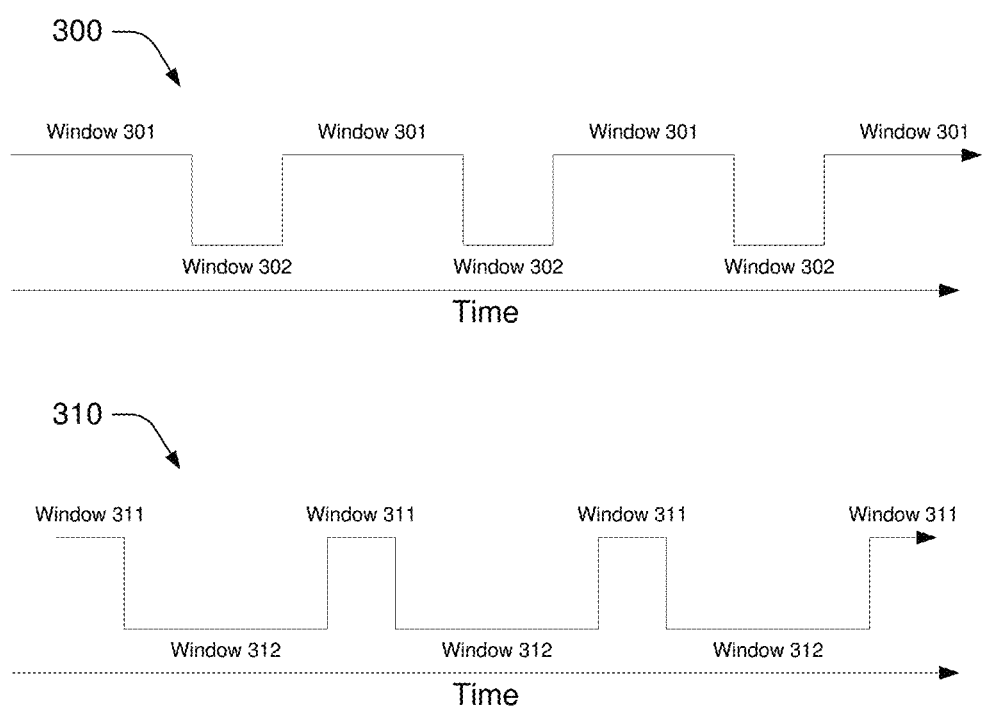
FIG. 3 illustrates example time division multiplexing patterns, in accordance with various aspects and embodiments of the subject disclosure.

Transmissions 221 and 222 can be made according to a time division multiplexing (TDM) pattern, which allots time windows for transmissions 221 and time windows for transmissions 222. Example TDM patterns are illustrated in FIG. 3. In some embodiments, the core networks 241, 242, can communicate a pattern 250 which sets the TDM pattern for transmissions 221 and 222. The core networks 241, 242, can update the agreed/negotiated pattern 250 in order to update the TDM pattern for transmissions 221 and 222. In some embodiments, UE 200 can send, to either or both core networks 241, 242 a TDM pattern coordination request in order to modify the TDM pattern at the UE 200. Furthermore, various communications described herein, in particular random access channel (RACH) communications such as described in FIG. 6, can be interpreted by core networks 241, 242 as an implied TDM pattern coordination request, thereby resulting in a core network 241 or 242 instructing UE 200 to apply an updated TDM pattern.

One example problem that can arise when multiple subscriber identities share a radio occurs when a first SIM is in an RRC idle state, a second SIM is in an RRC connected state on an active voice call, and a network pages the first SIM. Embodiments of this disclosure allow the UE 200 to respond to the page on the first SIM without waiting until the voice call on the second SIM has ended.

Another example problem that can arise when multiple subscriber identities share a radio occurs when a first SIM is in an RRC connected state in an active data session, and a voice call arrives on a second SIM. Embodiments of this disclosure allow the second SIM to enter the voice call without fully suspending the data session on the first SIM, thereby avoiding suspension of the application or service that was associated with the first SIM.

Without the advantages of this disclosure, depending upon the use case, such loss of service to the first SIM could be inconvenient, disruptive, or even harmful to the subscriber. For example, if the voice call on the second SIM lasts sufficiently long, radio activity timers on the first SIM can expire, causing the radio connection corresponding to the first SIM to be suspended and the RRC state to be transitioned to RRC idle. Consequently, at the end of the voice call on the second SIM, resuming the data session on the first SIM would require performing an entire RRC connection establishment procedure from the beginning. This can cause significant delay in resuming the data session, thereby causing additional inconvenience to the subscriber who may already be in an inconvenienced situation with the data session being suspended.

The above example problems can be overcome by embodiments of this disclosure. For example, when a first SIM, e.g. SIM 205 is in and RRC idle state, and a second SIM 201 is in an RRC connected state on an active voice call, if a page is received for the first SIM 205, this disclosure allows the UE 200 to respond to the page on the first SIM 205 via a communication procedure performed during an appropriate TDM window, in order to trigger an RRC connection re-establishment procedure for the first SIM 205.

Furthermore, when a first SIM, in this example, SIM 201, is in an RRC connected state in an active data session, and a voice call arrives on a second SIM 205, embodiments of this disclosure allow the data session on the first SIM 201 to be kept alive for the duration of the voice call on the second SIM 205. The data session on the first SIM 201 can be transitioned to an RRC inactive state (rather than an idle state) when a voice call arrives on the second SIM 205. During the RRC inactive state, the UE 200 can continue to send or receive small amounts of data to/from the network 241 using a communication procedure during the appropriate TDM windows for the first SIM 201. Due to the small amount of data being transmitted/received in the inactive state, the network 241 can release the UE 200 to an RRC inactive state. This allows the UE 200 to continue to transact small amounts of data on the first SIM 201 even while the voice call is ongoing on the second SIM 205. This solution also enables a quicker transition of the first SIM 201 from the RRC inactive state to the RRC connected state when eventually the voice call on the second SIM 205 ends and the data session on first SIM 201 can be resumed.

Embodiments of this disclosure can thus enable a multi-SIM device such as UE 200, in which SIMs share a radio, to respond to a page received on an idle-state SIM while another SIM is actively using the radio, e.g., in an active data session or on an active voice call. Furthermore, a SIM need not fully suspend a data session while there is an active voice call on another SIM. Additional aspects include lower latency in resuming a data session on a SIM after a voice call on another SIM has ended, and improved experience for subscribers using multi-SIM devices in which SIMS share a radio.

FIG. 3 illustrates example time division multiplexing patterns, in accordance with various aspects and embodiments of the subject disclosure. FIG. 3 illustrates a first example TDM pattern 300 and a second example TDM pattern 310. First example TDM pattern 300 can comprise, e.g., a TDM pattern initially used by radio 220, illustrated in FIG. 2, and second example TDM pattern 310 can comprise, e.g., a subsequent TDM pattern used by radio 220.

First example TDM pattern 300 includes first time windows 301 and second time windows 302. The first time windows 301 can be, e.g., for a first subscriber radio use associated with a first subscriber identity, such as the first subscriber radio use 203 illustrated in FIG. 2. In this regard, first time windows 301 can be used by radio 220 for transmissions 221. The second time windows 302 can be, e.g., for a second subscriber radio use associated with a second subscriber identity, such as the second subscriber radio use 207 illustrated in FIG. 2. In this regard, second time windows 302 can be used by radio 220 for transmissions 222.

Second example TDM pattern 310 includes third time windows 311 and fourth time windows 312. The third time windows 311 can be, e.g., for the first subscriber radio use 203 illustrated in FIG. 2. The fourth time windows 312 can be, e.g., for the second subscriber radio use 207 illustrated in FIG. 2. It will be appreciated that time windows 301 in the first TDM pattern 300 are different from time windows 311 in the second TDM pattern 310, and the nature of the first subscriber radio use 203 can also change along with a radio's TDM pattern changes. Similarly, time windows 302 in the first TDM pattern 300 are different from time windows 312 in the second TDM pattern 310, and the nature of the second subscriber radio use can also change, as described herein.

Figure 4:
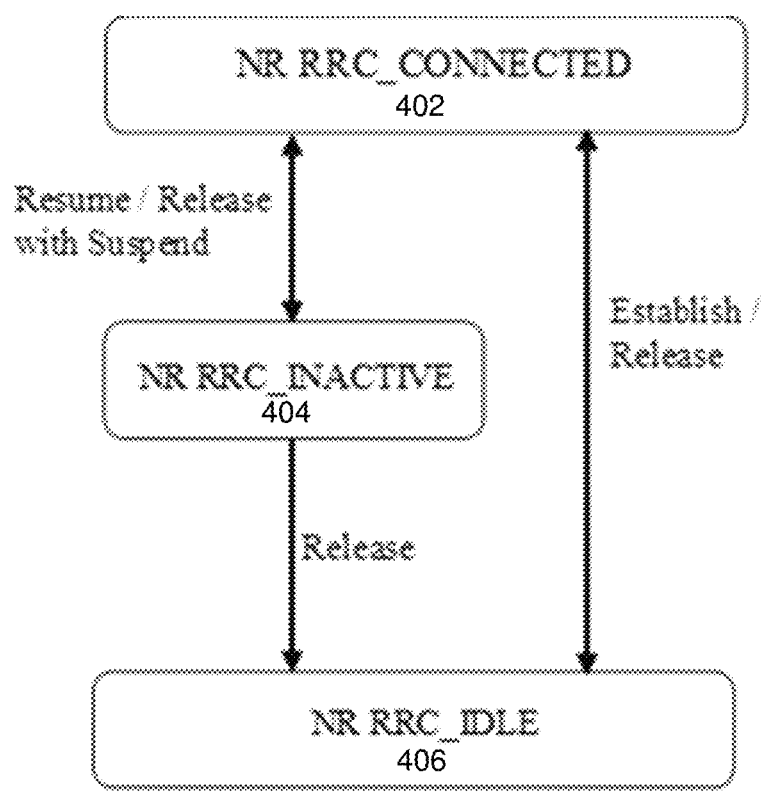
FIG. 4 illustrates example radio resource control (RRC) protocol states, in accordance with various aspects and embodiments of the subject disclosure.

FIG. 4 illustrates example radio resource control (RRC) protocol states, in accordance with various aspects and embodiments of the subject disclosure. RRC states can be implemented at a UE as well as at a RAN, e.g., as illustrated in FIG. 2. RRC states generally include a "connected" state 402, an "inactive" state 404, and an "idle" state 406. Operations illustrated in FIG. 4 can be used to transition a subscriber identity between the different RRC states. Thus, an "establish" operation can transition a subscriber identity from "idle" to "connected". A "release" operation can transition a subscriber identity from "connected" to "idle". A "resume" operation can transition a subscriber identity from "inactive" to "connected". A "release with suspend" operation can transition a subscriber identity from "connected" to "inactive". A "release" operation can transition a subscriber identity from "inactive" to "idle".

Figure 5:
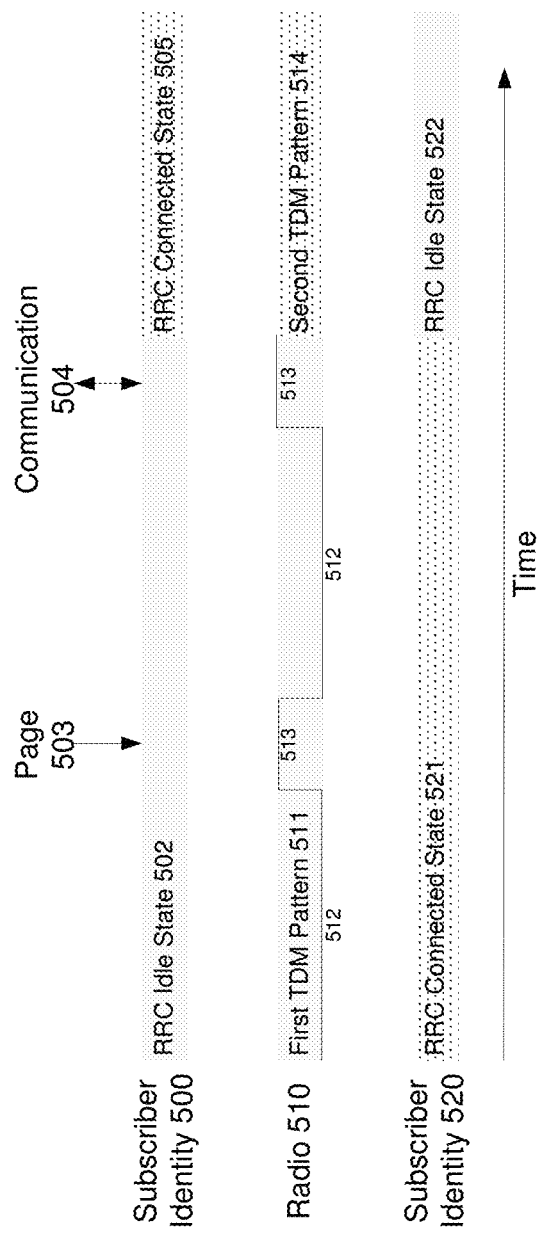
FIG. 5 illustrates a first example scenario and operations involved in sharing a radio by multiple subscriber identities at a device, in accordance with various aspects and embodiments of the subject disclosure.

FIG. 5 illustrates a first example scenario and operations involved in sharing a radio by multiple subscriber identities at a device, in accordance with various aspects and embodiments of the subject disclosure. FIG. 5 illustrates a subscriber identity 500, a radio 510, and a subscriber identity 520. Subscriber identity 500 is initially in an RRC idle state 502, and transitions into an RRC connected state 505. Subscriber identity 520 is initially in an RRC connected state 521, and transitions into an RRC idle state 522.

Radio 510 is initially in a first TDM pattern 511, which comprises time windows 512 for use by the subscriber identity 520, and time windows 513 for use by the subscriber identity 500. Radio 510 transitions into a second TDM pattern 514.

A page 503 is received at subscriber identity 500 while subscriber identity 500 is in the RRC idle state 502. Page 503 can be delivered to subscriber identity 500 during a first illustrated time window of time windows 513. In response to the page 503, a communication 504 is initiated from subscriber identity 500 during a subsequent illustrated time window of time windows 513. Communication 504 can trigger the transition of subscriber identity 500 to the RRC connected state 505, the transition of radio 510 to the second TDM pattern 514, and the transition of subscriber identity 520 to the RRC idle state 505, as described further herein.

In the first example scenario illustrated in FIG. 5, a second subscriber identity 520 on a DSDS device, such as SIM 201 at UE 200 in FIG. 2, can be in an RRC connected state 521 on an active voice call, while the first subscriber identity 500, such as SIM 201 at UE 200 in FIG. 2, is in an RRC idle state 502. It is assumed that core networks corresponding to the two subscriber identities 500, 520 on the DSDS device have already exchanged a TDM pattern, to be used as first TDM pattern 511, allowing the second subscriber identity 520 to transmit speech frames for the voice call, while giving small windows 513 of opportunity to the first subscriber identity 500 to receive paging notifications, such as page 503, from a network. In response to page 503, first subscriber identity 500 can generate a communication 504 which triggers RRC state changes as well as a change in TDM pattern. One example communication 504 is a random access channel (RACH) communication such as illustrated in FIG. 6.

Figure 6:
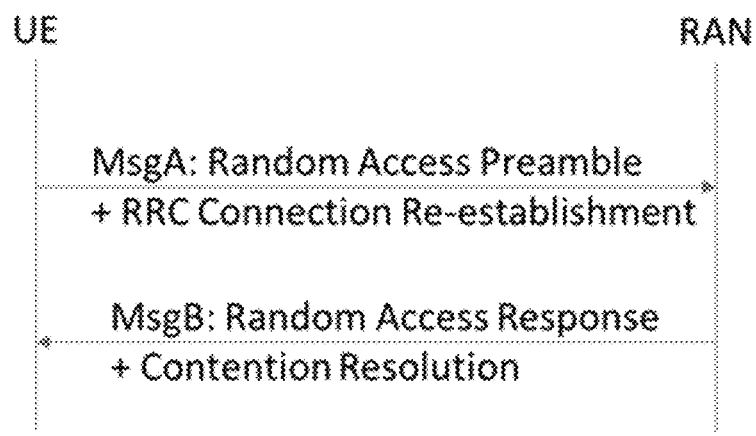
FIG. 6 illustrates an example random access channel (RACH) communication to trigger a change in radio use at a device, in accordance with various aspects and embodiments of the subject disclosure.

FIG. 6 illustrates an example random access channel (RACH) communication to trigger a change in radio use at a device, in accordance with various aspects and embodiments of the subject disclosure. In the illustrated embodiment, a 2-step RACH procedure comprises a message A (MsgA), from a UE to a RAN and corresponding core network, and a message B (MsgB), from the RAN back to the UE. MsgA can include a random-access preamble transmission on a physical random access channel (PRACH) and an uplink data transmission on a physical uplink shared channel (PUSCH). MsgB can include a random access response along with contention resolution information.

In the illustrated embodiment, the data transmission in MsgA comprises an RRC connection re-establishment message. Based on configured policy, a first core network, upon reception of the RRC connection re-establishment message from a device on a first SIM, can transition the first SIM to the RRC connected state and send a trigger to a second core network to renegotiate or switch the TDM pattern between the two SIMs. The reception of such a TDM pattern trigger at the second core network, potentially with appropriate parameters indicating desired action, can trigger the second core network to suspend the voice call on the second SIM.

Figure 7:
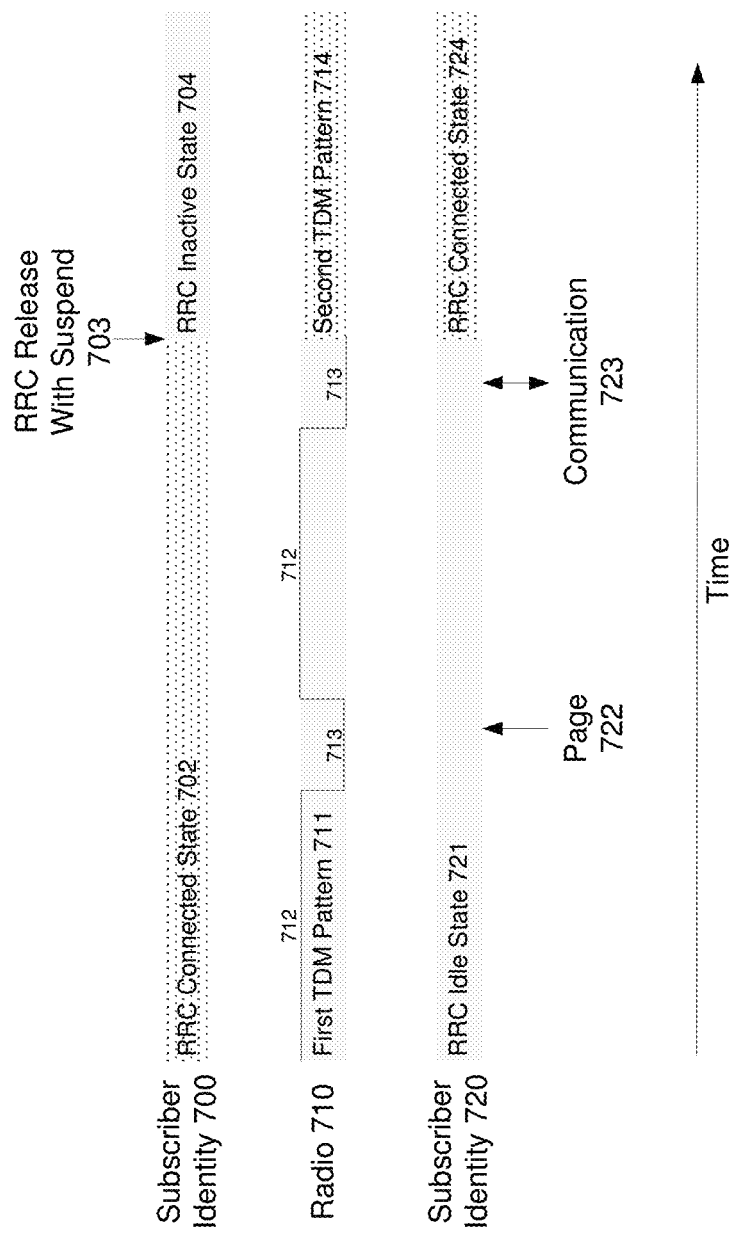
FIG. 7 illustrates a second example scenario and operations involved in sharing a radio by multiple subscriber identities at a device, in accordance with various aspects and embodiments of the subject disclosure.

FIG. 7 illustrates a second example scenario and operations involved in sharing a radio by multiple subscriber identities at a device, in accordance with various aspects and embodiments of the subject disclosure. FIG. 7 illustrates a subscriber identity 700, a radio 710, and a subscriber identity 720. Subscriber identity 700 is initially in an RRC connected state 702, and transitions into an RRC inactive state 705. Subscriber identity 720 is initially in an RRC idle state 521, and transitions into an RRC connected state 724.

Radio 710 is initially in a first TDM pattern 711, which comprises time windows 712 for use by the subscriber identity 700, and time windows 713 for use by the subscriber identity 720. Radio 710 transitions into a second TDM pattern 714.

A page 722 is received at subscriber identity 720 while subscriber identity 720 is in the RRC idle state 721, and during a first illustrated time window of time windows 713. A communication 723 is initiated from subscriber identity 720 during a second illustrated time window of time windows 713. Communication 723 can trigger the transition of subscriber identity 720 to the RRC connected state 724, the transition of radio 710 to the second TDM pattern 714, and the transition of subscriber identity 700 to the RRC inactive state 704. The transition of subscriber identity 700 to the RRC inactive state 704 can also be implemented by an RRC release with suspend operation, such as illustrated in FIG. 4.

In the second example scenario illustrated in FIG. 7, a first subscriber identity 700 is in an RRC connected state 702 in an active data session, while a second subscriber identity 720 is in an RRC idle state 721, and second subscriber identity 720 is monitoring for pages during its appropriate assigned TDM windows 713. When a page 722 for a voice call arrives for the second subscriber identity 720, subscriber identity 720 performs a communication 723 including an RRC connection re-establishment request such as illustrated in FIG. 6, in order to initiate the illustrated transitions.

Upon reception of the RRC connection re-establishment request by a second core network corresponding to the second subscriber identity 720, the second core network can trigger a TDM pattern coordination procedure with the first core network corresponding to the first subscriber identity 700, optionally with appropriate parameters indicating the need to transition the data session on first core network to the RRC inactive state 704. This prompts the first core network to transmit an RRC release message with suspend (suspendConfig) to the first subscriber identity 700, thereby transitioning the first subscriber identity 700 to the RRC inactive state 704.

In another alternative, after sending the RRC connection re-establishment request included in communication 723 to the second core network, the UE can send a message to the first core network indicating the need to transition the first subscriber identity's 700 data session on the first core network to the RRC inactive state 704. This may be beneficial for some embodiments since suspension of a data session for a sufficient period of time can trigger an automatic transition to an RRC idle state, which is not the desired behaviour since the delay to resume a data session upon the completion of the voice call on the second subscriber identity 720 would be larger. In addition, a "keep alive" indication from the UE to the first core network can indicate a time period for maintaining the data session in a suspended state, and/or an updated TDM pattern for the first core network, which can be used for the first subscriber identity 700 to send subsequent "keep alive" indications or perform 2-step RACH procedures with small data transmissions to prevent transition to the RRC idle state.

Figure 8:
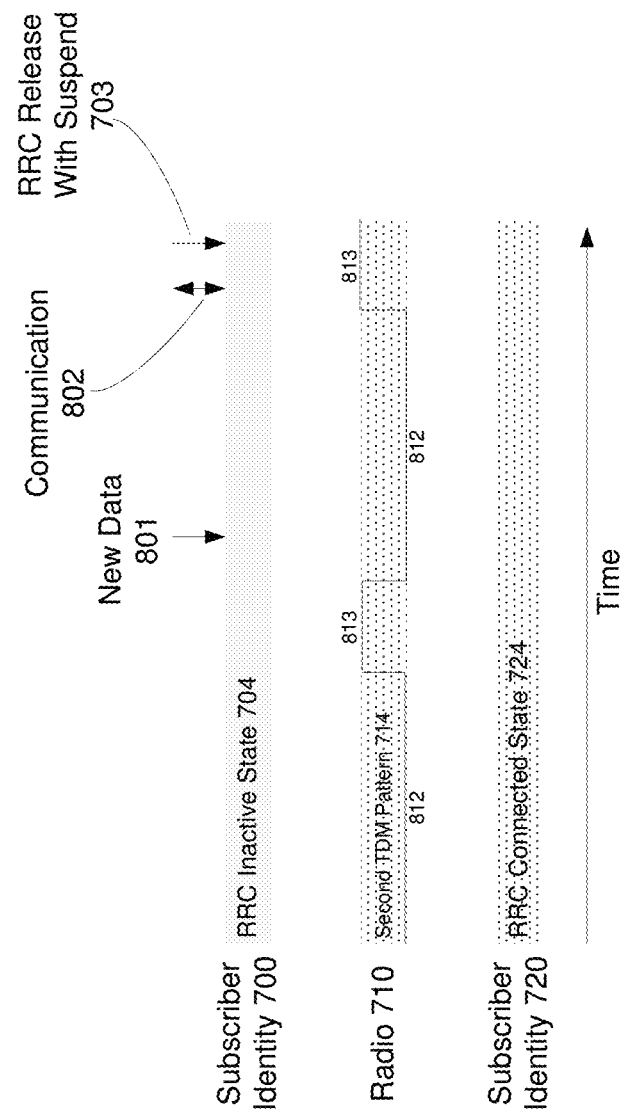
FIG. 8 illustrates example data transmissions for an inactive subscriber identity, in accordance with various aspects and embodiments of the subject disclosure.

FIG. 8 illustrates data transmissions for an inactive subscriber identity, in accordance with various aspects and embodiments of the subject disclosure. FIG. 8 illustrates the subscriber identity 700, the radio 710, and the subscriber identity 720. Subscriber identity 700 is in the RRC inactive state 705 introduced in FIG. 7. Subscriber identity 720 is in the RRC connected state 724 introduced in FIG. 7, and radio 710 is in the second TDM pattern 714 introduced in FIG. 7. Second TDM pattern 714 comprises time windows 812 for use by the subscriber identity 720, and time windows 813 for use by the subscriber identity 700.

New data 801 is received at subscriber identity 700 while subscriber identity 700 is in the RRC inactive state 704. A communication 802 is initiated from subscriber identity 700 during a second illustrated time window of time windows 813, and an RRC release with suspend 703 is received subscriber identity 700. Communication 802 can transmit a small amount of data to keep the subscriber identity 700 in the RRC inactive state, instead of allowing the subscriber identity 700 to fall into an RRC idle state.

In FIG. 8, the second subscriber identity 720 has transitioned to RRC connected state 724 and is on an active voice call, while the first subscriber identity 700 is in RRC inactive state 704, and the TDM pattern 714 between the two subscriber identities 700, 720 has been switched to enable the second subscriber identity 720 to transmit speech frames while providing some TDM windows 813 of opportunity to the first subscriber identity 700 that is in RRC inactive state 704.

Figure 9:
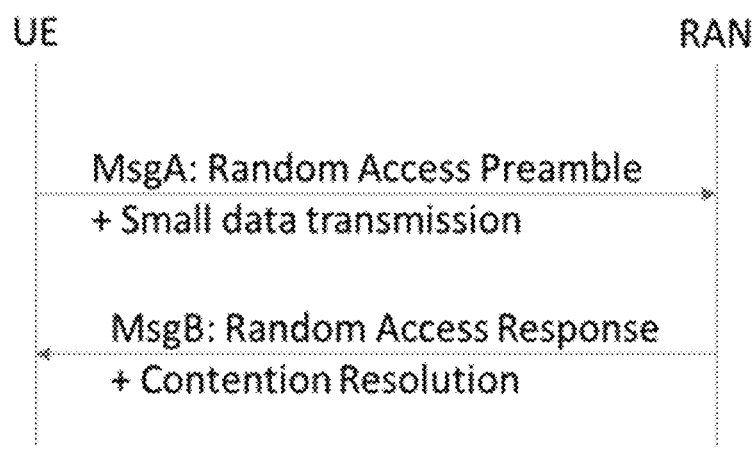
FIG. 9 illustrates an example RACH communication for use in the data transmissions of FIG. 8, in accordance with various aspects and embodiments of the subject disclosure.

When in the RRC inactive state 704, if applications or services corresponding to subscriber identity 700 need to transmit or receive small amounts of data, for example, to keep alive a service or application, the radio 710 can transmit or receive small amounts of data in the appropriate TDM windows 813 using communications such as communication 802. Communication 802 can comprise, e.g., a two-step RACH procedure with a small data transmission as illustrated in FIG. 9. Following the communication 802, if the amount of data that needs to be transmitted or received is small, the first network corresponding to the first subscriber identity 700 can transmit an RRC release with suspend 804 to the first subscriber identity 700 to keep the first subscriber identity 700 in RRC inactive state 704. This solution allows services or applications associated with the first subscriber identity 700 to continue to transact small amounts of data while there is an ongoing voice call on the second subscriber identity 720.

FIG. 9 illustrates an example RACH communication for use in the data transmissions of FIG. 8, in accordance with various aspects and embodiments of the subject disclosure. In the illustrated embodiment, a 2-step RACH procedure comprises a message A (MsgA), from a UE to a RAN and corresponding core network, and a message B (MsgB), from the RAN back to the UE. Similar to FIG. 6, MsgA can include a random-access preamble transmission on a physical random access channel (PRACH) and an uplink data transmission on a physical uplink shared channel (PUSCH). MsgB can include a random access response along with contention resolution information.

In FIG. 9, the data transmission in MsgA comprises at least one small data transmission for a data session service or application associated with the first subscriber identity 700. By keeping the data session alive, the subscriber identity 700 can remain in the RRC inactive state until such time as it can switch back to an RRC connected state. When the voice call on the second subscriber identity 720 ends, the second core network corresponding to the second subscriber identity 720 can again trigger a TDM pattern coordination with the first core network, with appropriate parameters indicating the transitioning of the second subscriber identity 720 to the RRC idle state. Such a TDM pattern coordination trigger can cause the first core network to transmit an RRC resume message to transition the first subscriber identity 700 to an RRC connected state, thereby fully resuming the data session on the first subscriber identity 700.

In another alternative, when the voice call on the second subscriber identity 720 ends, the UE comprising subscriber identities 700, 720 can send an indication to the first core network that the first subscriber identity 700 can be transitioned from the RRC idle state or RRC inactive state 704 to an RRC connected state, along with an updated TDM pattern for the first core network, to be used when the data session on the first subscriber identity 700 is fully resumed.

Figure 10:
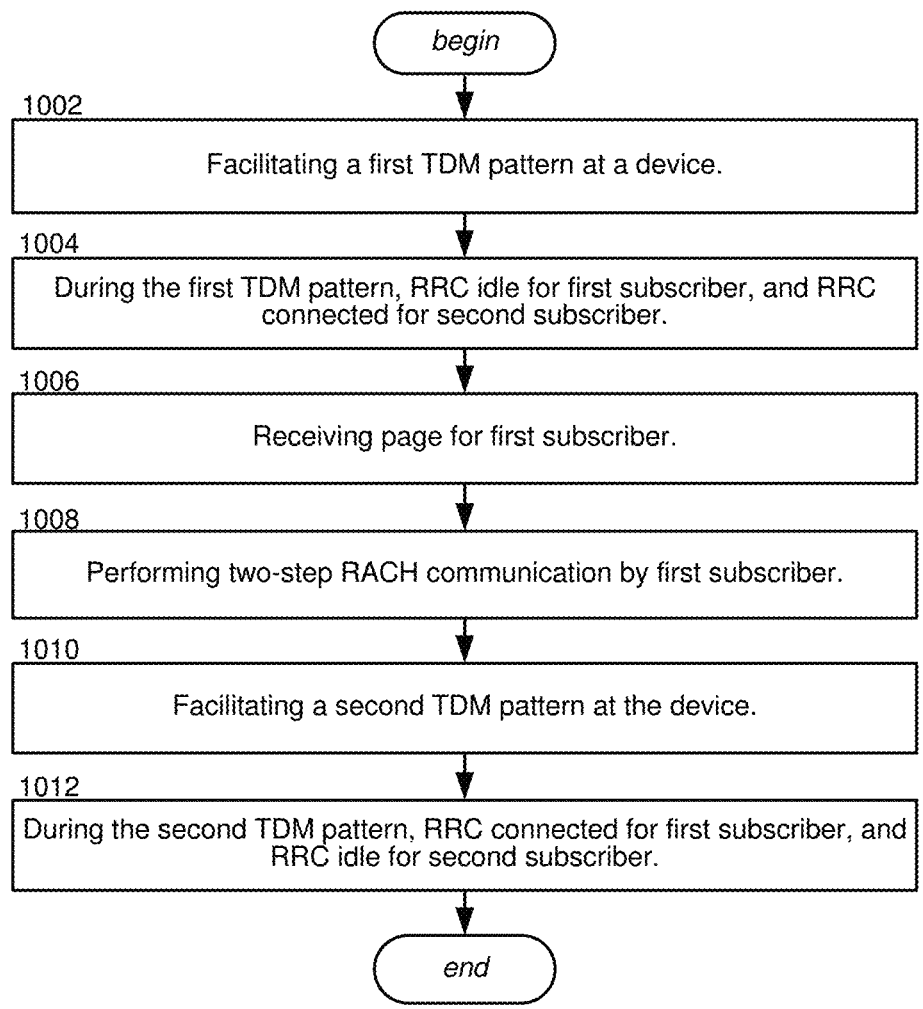
FIG. 10 is a flow diagram representing example operations involved in sharing a radio by multiple subscriber identities at a device in the scenario illustrated in FIG. 5, in accordance with various aspects and embodiments of the subject disclosure.

FIG. 10 is a flow diagram representing example operations involved in sharing a radio by multiple subscriber identities at a device in the scenario illustrated in FIG. 5, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

Example operations comprise operation 1002, which represents facilitating a first TDM pattern at a device. For example, as illustrated in FIG. 5, a first TDM pattern 511 can be initiated at radio 510. The first TDM pattern 511 can comprise first time windows 513 for a first subscriber radio use associated with a first subscriber identity 500 of multiple wireless subscriber identities 500, 520 to share the radio 510, and second time windows 512 for a second subscriber radio use associated with a second subscriber identity 520 of the multiple wireless subscriber identities 500, 520.

Example operations comprise operation 1004, which represents during the first TDM pattern, an RRC idle state for the first subscriber, and an RRC connected state for second subscriber. For example, as illustrated in FIG. 5, during the first TDM pattern 511, a RRC protocol is in an idle state 502 for the first subscriber 500 radio use, and the RRC protocol is in a connected state 521 for the second subscriber 520 radio use. The second subscriber 520 radio use can comprise, e.g., a voice call.

Example operations comprise operation 1006, which represents receiving a page for the first subscriber. For example, as illustrated in FIG. 5, a page 503 can be received for the first subscriber 500. The page 503 can for example notify the first subscriber 500 of an incoming voice call to first subscriber 500.

Example operations comprise operation 1008, which represents performing a two-step RACH communication by the first subscriber. For example, as illustrated in FIG. 5, first subscriber 500 can perform communication 504. Communication 504 can comprise a two-step RACH communication such as illustrated in FIG. 6.

Example operations comprise operation 1010, which represents facilitating a second TDM pattern at the device. For example, as illustrated in FIG. 5, a second TDM pattern 514 can be initiated at radio 510. The second TDM pattern 514 can comprise third time windows for the first subscriber radio use, and fourth time windows for the second subscriber radio use, e.g. as illustrated in FIG. 3.

Example operations comprise operation 1012, which represents, during the second TDM pattern, an RRC connected state for the first subscriber, and an RRC idle state for the second subscriber. For example, as illustrated in FIG. 5, during the second TDM pattern 514, a RRC protocol is in a connected state 505 for the first subscriber 500 radio use, and the RRC protocol is in an idle state 522 for the second subscriber 520 radio use. The first subscriber 500 voice call is now connected and the primary radio 510 use, while the second subscriber 520 voice call is terminated, however time windows in second TDM pattern 514 give second subscriber 520 an opportunity to receive subsequent pages etc.

Figure 11:
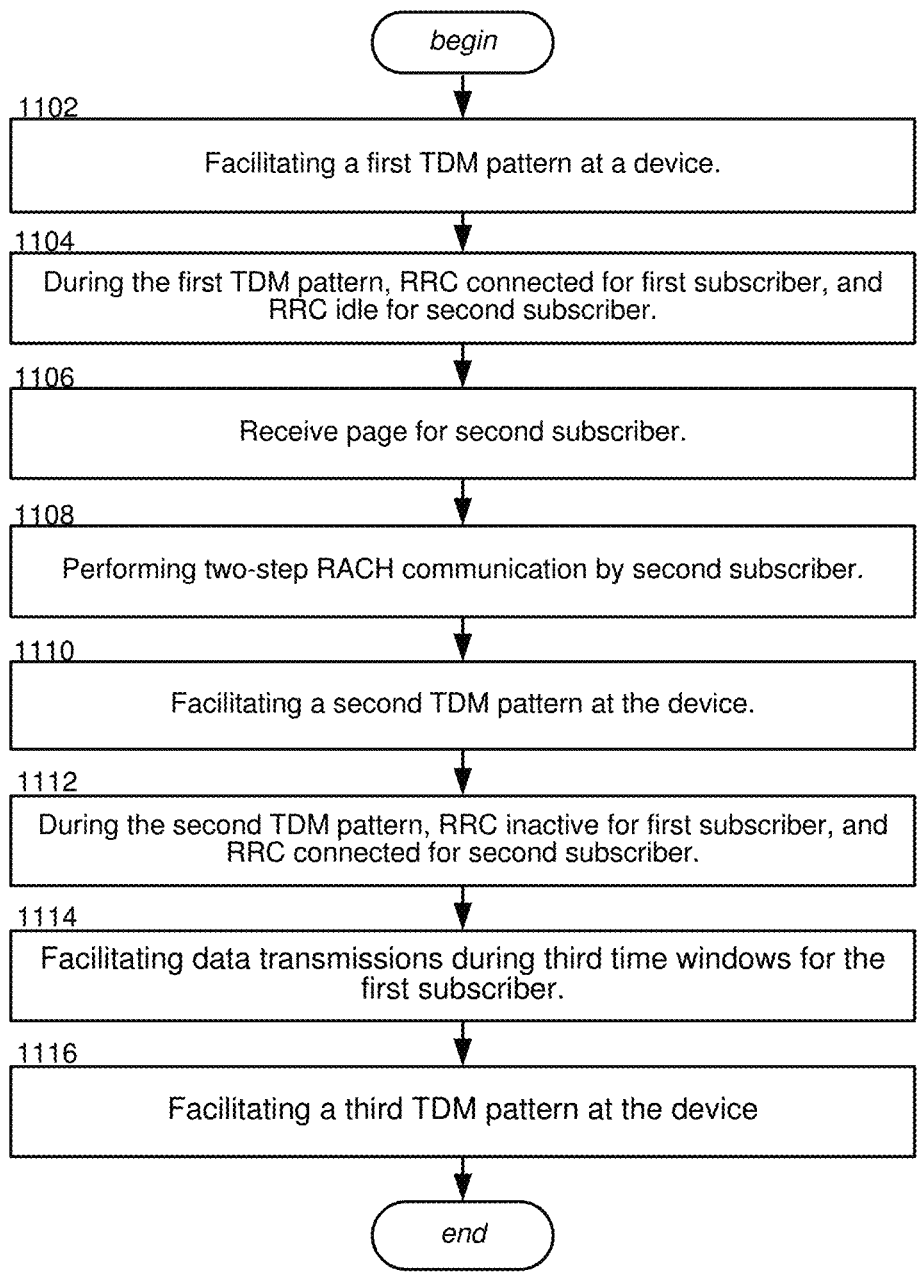
FIG. 11 is a flow diagram representing example operations involved in sharing a radio by multiple subscriber identities at a device in the scenario illustrated in FIG. 7, in accordance with various aspects and embodiments of the subject disclosure.

FIG. 11 is a flow diagram representing example operations involved in sharing a radio by multiple subscriber identities at a device in the scenario illustrated in FIG. 7, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

Example operations comprise operation 1102, which represents facilitating a first TDM pattern at a device. For example, as illustrated in FIG. 7, a first TDM pattern 711 can be initiated at radio 710. The first TDM pattern 711 can comprise first time windows 712 for a first subscriber radio use associated with a first subscriber identity 700 of multiple wireless subscriber identities 700, 720 to share the radio 710, and second time windows 713 for a second subscriber radio use associated with a second subscriber identity 720 of the multiple wireless subscriber identities 700, 720.

Example operations comprise operation 1104, which represents during the first TDM pattern, an RRC connected state for the first subscriber, and an RRC idle state for second subscriber. For example, as illustrated in FIG. 7, during the first TDM pattern 711, a RRC protocol is in a connected state 702 for the first subscriber 700 radio use, and the RRC protocol is in an idle state 721 for the second subscriber 720 radio use. The first subscriber 700 radio use can comprise, e.g., a data session.

Example operations comprise operation 1106, which represents receiving a page for the second subscriber. For example, as illustrated in FIG. 7, a page 722 can be received for the second subscriber 720. The page 722 can for example notify the second subscriber 720 of an incoming voice call to first subscriber 720.

Example operations comprise operation 1108, which represents performing a two-step RACH communication by the second subscriber. For example, as illustrated in FIG. 7, second subscriber 720 can perform communication 723. Communication 723 can comprise a two-step RACH communication such as illustrated in FIG. 6.

Example operations comprise operation 1110, which represents facilitating a second TDM pattern at the device. For example, as illustrated in FIG. 7, a second TDM pattern 714 can be initiated at radio 710. The second TDM pattern 714 can comprise third time windows for the first subscriber radio use, and fourth time windows for the second subscriber radio use, e.g. as illustrated in FIG. 3.

Example operations comprise operation 1112, which represents, during the second TDM pattern, an RRC inactive state for the first subscriber, and an RRC connected state for the second subscriber. For example, as illustrated in FIG. 7, during the second TDM pattern 714, a RRC protocol is in an inactive state 704 for the first subscriber 700 radio use, and the RRC protocol is in a connected state 724 for the second subscriber 720 radio use. The second subscriber 720 voice call is now connected and the primary radio 710 use, while the first subscriber 700 data session is inactive, however time windows in second TDM pattern 714 give first subscriber 700 an opportunity to make small data transmissions to keep the data session alive and quickly restorable from the inactive state.

Example operations comprise operation 1114, which represents facilitating data transmissions during third time windows for the first subscriber. For example, as illustrated in FIG. 8, during the RRC inactive state 704, subscriber identity 700 can nonetheless make data transmissions via communications such as communication 802, which is further illustrated in FIG. 9.

Example operations comprise operation 1116, which represents facilitating a third TDM pattern at the device. For example, with reference to FIG. 7, after the voice call by subscriber 720 is terminated, the RRC connected state 724 can be returned to idle, the second TDM pattern 714 can be replaced by a third TDM pattern, such as a return to the first TDM pattern 711, and RRC inactive state 704 can be returned to a connected state 702, to restore the data session of subscriber identity 700.

Figure 12:
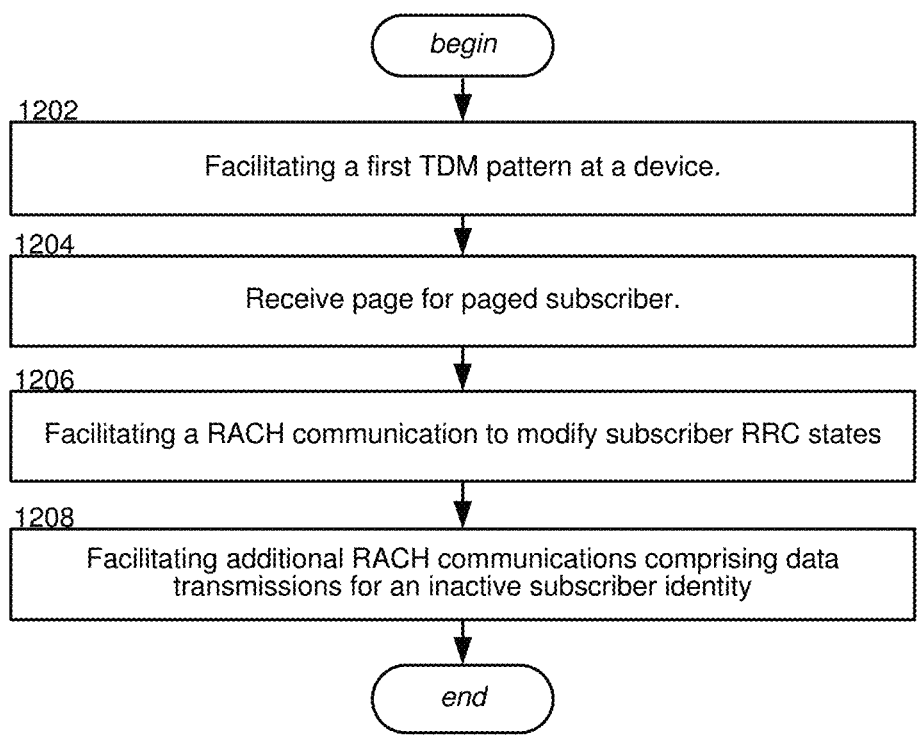
FIG. 12 is a flow diagram representing example operations to switch from primary radio use by a first subscriber identity to primary radio use by a second subscriber identity, in accordance with various aspects and embodiments of the subject disclosure.

FIG. 12 is a flow diagram representing example operations to switch from primary radio use by a first subscriber identity to primary radio use by a second subscriber identity, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

Example operations comprise operation 1202, which represents facilitating a first TDM pattern at a device. For example, as illustrated in FIG. 7, a first TDM pattern 711 can be initiated at radio 710. The first TDM pattern 711 can comprise first time windows 712 for a first subscriber radio use associated with a first subscriber identity 700 of multiple wireless subscriber identities 700, 720 to share the radio 710, and second time windows 713 for a second subscriber radio use associated with a second subscriber identity 720 of the multiple wireless subscriber identities 700, 720.

Example operations comprise operation 1204, which represents receiving a page for a paged subscriber. For example, as illustrated in FIG. 7, a page 722 can be received for the second subscriber 720. The page 722 can for example notify the second subscriber 720 of an incoming voice call to first subscriber 720. In general, the paged subscriber can be a subscriber in an RRC idle or RRC inactive state.

Example operations comprise operation 1206, which represents facilitating a RACH communication to modify subscriber RRC states. For example, as illustrated in FIG. 7, second subscriber 720 can perform communication 723. Communication 723 can comprise a two-step RACH communication such as illustrated in FIG. 6. Communication 723 can trigger RRC protocol state changes to modify subscriber RRC states for all subscribers 700, 720 sharing the radio 710.

Example operations comprise operation 1208, which represents facilitating additional RACH communications comprising data transmissions for an inactive subscriber identity. For example, as illustrated in FIG. 8, during the RRC inactive state 704, subscriber identity 700 can nonetheless make data transmissions via communications such as communication 802, which is further illustrated in FIG. 9.

Figure 13:
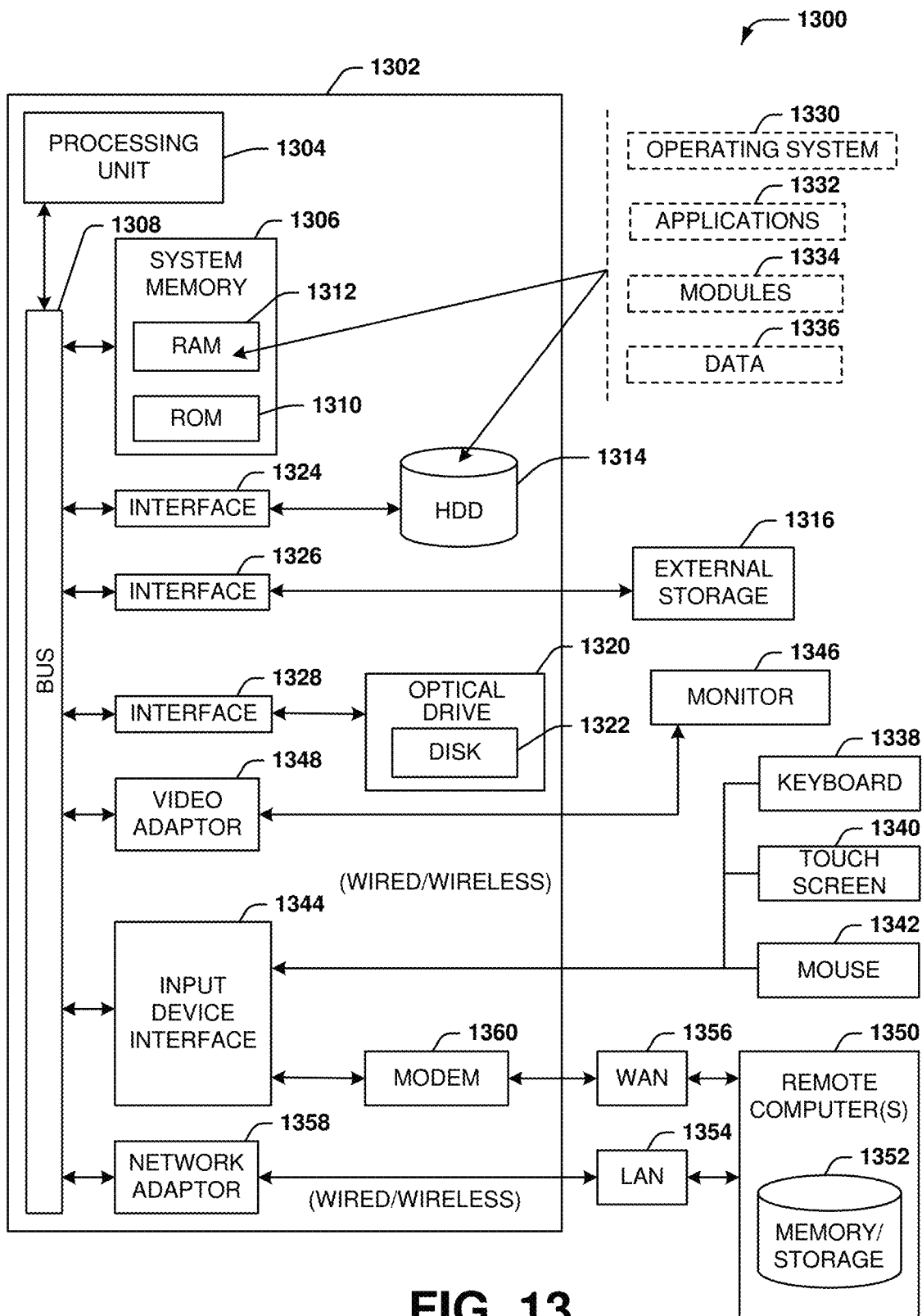
FIG. 13 is a block diagram of an example computer that can be operable to execute processes and methods in accordance with various aspects and embodiments of the subject disclosure.

FIG. 13 is a block diagram of an example computer that can be operable to execute processes and methods in accordance with various aspects and embodiments of the subject disclosure. The example computer can be adapted to implement, for example, UE, a RAN device, or a core network device, as described herein.

FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enable with a security module, such as a trusted processing module (TPM). For instance with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   facilitating a first time division multiplexing pattern at a device, wherein the first time division multiplexing pattern comprises first time windows for a first subscriber radio use associated with a first subscriber identity of multiple wireless subscriber identities to share a radio at the device, and second time windows for a second subscriber radio use associated with a second subscriber identity of the multiple wireless subscriber identities,
   wherein, during the first time division multiplexing pattern, a radio resource control protocol is in an idle state for the first subscriber radio use, and the radio resource control protocol is in a connected state for the second subscriber radio use; and
   in response to a communication associated with the first subscriber identity, facilitating a second time division multiplexing pattern at the device, wherein the second time division multiplexing pattern comprises third time windows for the first subscriber radio use, and fourth time windows for the second subscriber radio use,
   wherein, during the second time division multiplexing pattern, the radio resource control protocol is in the connected state for the first subscriber radio use, and the radio resource control protocol is in the idle state for the second subscriber radio use.

2. The method of claim 1, wherein the communication associated with the first subscriber identity comprises a random access channel communication.

3. The method of claim 2, wherein the random access channel communication comprises a two-step random access channel communication.

4. The method of claim 1, wherein the communication associated with the first subscriber identity comprises a radio resource control protocol connection re-establishment message.

5. The method of claim 1, wherein, during the first time division multiplexing pattern, the second subscriber radio use comprises a voice call.

6. The method of claim 1, wherein the first subscriber identity and the second subscriber identity, respectively, are associated with a first respective subscriber identity module at the device and a second respective subscriber identity module at the device.

7. The method of claim 1, wherein the communication associated with the first subscriber identity is responsive to a page communication received at the device.

8. A device, comprising:
   a processor; and
   a memory that stores executable instructions that, when executed by the processor, facilitate performance of operations, comprising:
      facilitating a first time division multiplexing pattern at the device, wherein a radio of the device is to be shared between multiple subscriber identities, and wherein the first time division multiplexing pattern comprises first time windows for first subscriber radio usage associated with a first subscriber identity of the multiple subscriber identities, and second time windows for second subscriber radio usage associated with a second subscriber identity of the multiple subscriber identities,
      wherein, during the first time division multiplexing pattern, a radio resource control protocol is in a connected state for the first subscriber radio usage, and the radio resource control protocol is an idle state for the second subscriber radio usage; and
      in response to a communication associated with the second subscriber identity, facilitating a second time division multiplexing pattern at the device, wherein the second time division multiplexing pattern comprises third time windows for the first subscriber radio usage, and fourth time windows for the second subscriber radio usage,
      wherein, during the second time division multiplexing pattern, the radio resource control protocol is in an inactive state for the first subscriber radio usage, and the radio resource control protocol is in the connected state for the second subscriber radio usage.

9. The device of claim 8, wherein, during the first time division multiplexing pattern, the first subscriber radio usage comprises an active data session, and wherein, during the second time division multiplexing pattern, the second subscriber radio usage comprises a voice call.

10. The device of claim 8, wherein the communication associated with the second subscriber identity is responsive to a voice call page communication received at the device.

11. The device of claim 8, wherein the communication associated with the second subscriber identity comprises a random access channel communication, and wherein the random access channel communication includes a radio resource control protocol connection re-establishment message.

12. The device of claim 8, wherein the operations further comprise facilitating data transmissions during the third time windows for the first subscriber radio usage.

13. The device of claim 8, wherein, during the second time division multiplexing pattern, the second subscriber radio usage comprises a voice call, and wherein the operations further comprise facilitating a third time division multiplexing pattern at the device in response to a termination of the voice call.

14. The device of claim 13, wherein the operations further comprise facilitating sending or receiving a radio resource control protocol resume message associated with the first subscriber identity in order to return the radio resource control protocol to the connected state for the first subscriber radio usage.

15. A non-transitory machine-readable medium, comprising executable instructions that, when executed by a processor, facilitate performance of operations, comprising:
facilitating a first time division multiplexing pattern at a device, wherein the first time division multiplexing pattern comprises first time windows for first subscriber radio use associated with a first subscriber identity, and second time windows for second subscriber radio use associated with a second subscriber identity; and
in response to receiving a page communication associated with a paged subscriber identity of the first subscriber identity or the second subscriber identity, facilitating a random access channel communication to modify a state of a radio resource control protocol associated with the paged subscriber identity.

16. The non-transitory machine-readable medium of claim 15, wherein the random access channel communication comprises a random-access preamble transmission on a physical random access channel and an uplink data transmission on a physical uplink shared channel.

17. The non-transitory machine-readable medium of claim 16, wherein the uplink data transmission includes a radio resource control protocol connection re-establishment message.

18. The non-transitory machine-readable medium of claim 15, wherein the random access channel communication comprises a random access response including contention resolution data.

19. The non-transitory machine-readable medium of claim 15, wherein the operations further comprise facilitating additional random access channel communications, the additional random access channel communications comprising data transmissions for an inactive subscriber identity of the first subscriber identity or the second subscriber identity.

20. The non-transitory machine-readable medium of claim 15, wherein the operations further comprise facilitating sending, to a first network associated with the first subscriber identity or a second network associated the second subscriber identity, a time division multiplexing pattern coordination request in order to modify the first time division multiplexing pattern at the device.

* * * * *